United States Patent [19]

Walton

[11] Patent Number: 5,392,419

[45] Date of Patent: Feb. 21, 1995

[54] LANGUAGE IDENTIFICATION SYSTEM AND METHOD FOR A PERIPHERAL UNIT

[75] Inventor: Sean E. Walton, Boise, Id.

[73] Assignee: Hewlett-Packard Company, Palo Alto, Calif.

[21] Appl. No.: 825,479

[22] Filed: Jan. 24, 1992

[51] Int. Cl.[6] ............................................ G06K 15/00
[52] U.S. Cl. .................................. 395/500; 395/112; 395/114
[58] Field of Search ......................... 395/500, 112, 114

[56] References Cited

U.S. PATENT DOCUMENTS

| | | | |
|---|---|---|---|
| 4,829,580 | 5/1989 | Church | 381/52 |
| 4,968,159 | 11/1990 | Sasaki et al. | 395/112 |
| 4,992,957 | 2/1991 | Aoyama et al. | 395/112 |
| 5,062,143 | 10/1991 | Schmitt | 382/36 |
| 5,146,544 | 9/1992 | Altham et al. | 395/115 |
| 5,165,014 | 11/1992 | Vassar | 395/112 |
| 5,222,200 | 6/1993 | Callister et al. | 395/112 |
| 5,228,118 | 7/1993 | Sasaki | 395/112 |
| 5,293,466 | 3/1994 | Bringmann | 395/114 |

FOREIGN PATENT DOCUMENTS

| | | |
|---|---|---|
| 0469974A2 | 2/1992 | European Pat. Off. . |
| 0545648 | of 1993 | European Pat. Off. . |
| 01314177 | 12/1989 | Japan . |
| WO9204672 | 3/1992 | WIPO . |

Primary Examiner—Parshotam S. Lall
Assistant Examiner—Viet Vu

[57] ABSTRACT

A data processing system is responsive to a plurality of input languages, each language adhering to a prescribed syntax. The presence of defined portions ("For" keys) in the incoming data indicate a vote for the presence of a language and the presence of other defined portions ("Against" keys) indicate a vote Against the presence of the language. The system performs the following method for identifying the input language: analyzing, for each expected language, the syntax of an incoming block of data to identify For and Against keys in the block of data; providing For and Against tallies for each expected language in response to the analysis, each tally being a summation of key entries, each key entry comprising an identified key count multiplied by a skew, a skew value indicating the importance of the key in the syntax and in the context of said block of data, the For tally summing entries of For keys and the Against tally summing entries of Against keys; comparing the For and Against tallies to determine whether or not they are so close as to signal uncertainty; and, based upon a further syntactical characteristic of block of data, resolving the uncertainty and indicating a value based on one of the tallies: indicating a value derived from the larger of the tallies in the event of no uncertainty between the tallies; and deciding, based upon the indicated value for each expected language, the identity of a received language.

21 Claims, 8 Drawing Sheets

FIG. 5A

POST SCRIPT (WEIGHT)

| KEY TYPE | WEIGHT |
|---|---|
| RESERVED WORD | 30 |
| SYNTAX ERROR | -50 |
| DOCUMENTATION FORMAT COMMAND | 80 |
| SPECIAL CHAR. SEQUENCE | 80 |
| UNKNOWN WORD | -20 |
| RESERVED PUNCTUATION "{}<>/( )[ ] %" | 15 |

FIG. 5B

PCL (WEIGHT)

| KEY TYPE | WEIGHT |
|---|---|
| ESCAPE CHARACTER | 10 |
| SHORT SEQUENCE | 80 |
| COMPLETE SEQUENCE | 80 |
| COMBINED SEQUENCE | 10 |
| ILLEGAL SEQUENCE | -30 |

FIG. 6

POST SCRIPT (CONTEXT)

| KEY TYPE | SKEW ACTION | INITIAL SKEW VALUE | SKEW MOD. |
|---|---|---|---|
| RESERVED WORD | GROWING | $+1.63 \times 10^{-7}$ | X4 |
| SYNTAX ERROR | CEILING | $-75$ | $\div 4$ |
| DOCUMENTATION FORMAT COMMAND | CEILING | $+40$ | $\div 4$ |
| SPECIAL CHAR. SEQUENCE | CEILING | $+75$ | $\div 4$ |
| UNKNOWN WORD | GROWING | $-7 \times 10^{-8}$ | X4 |
| RESERVED PUNCTUATION | GROWING | $+2.79 \times 10^{-7}$ | X4 |

FIG. 7

PCL (CONTEXT)

| KEY TYPE | SKEW ACTION | INITIAL SKEW VALUE | SKEW MOD. |
|---|---|---|---|
| ESCAPE CHARACTER | CEILING | $+12$ | $\div 2$ |
| SHORT SEQUENCE | CEILING | $+75$ | $\div 2$ |
| COMPLETE SEQUENCE | CEILING | $+75$ | $\div 2$ |
| COMBINED SEQUENCE | CEILING | $+75$ | $\div 2$ |
| ILLEGAL SEQUENCE | CEILING | $-75$ | $\div 2$ |

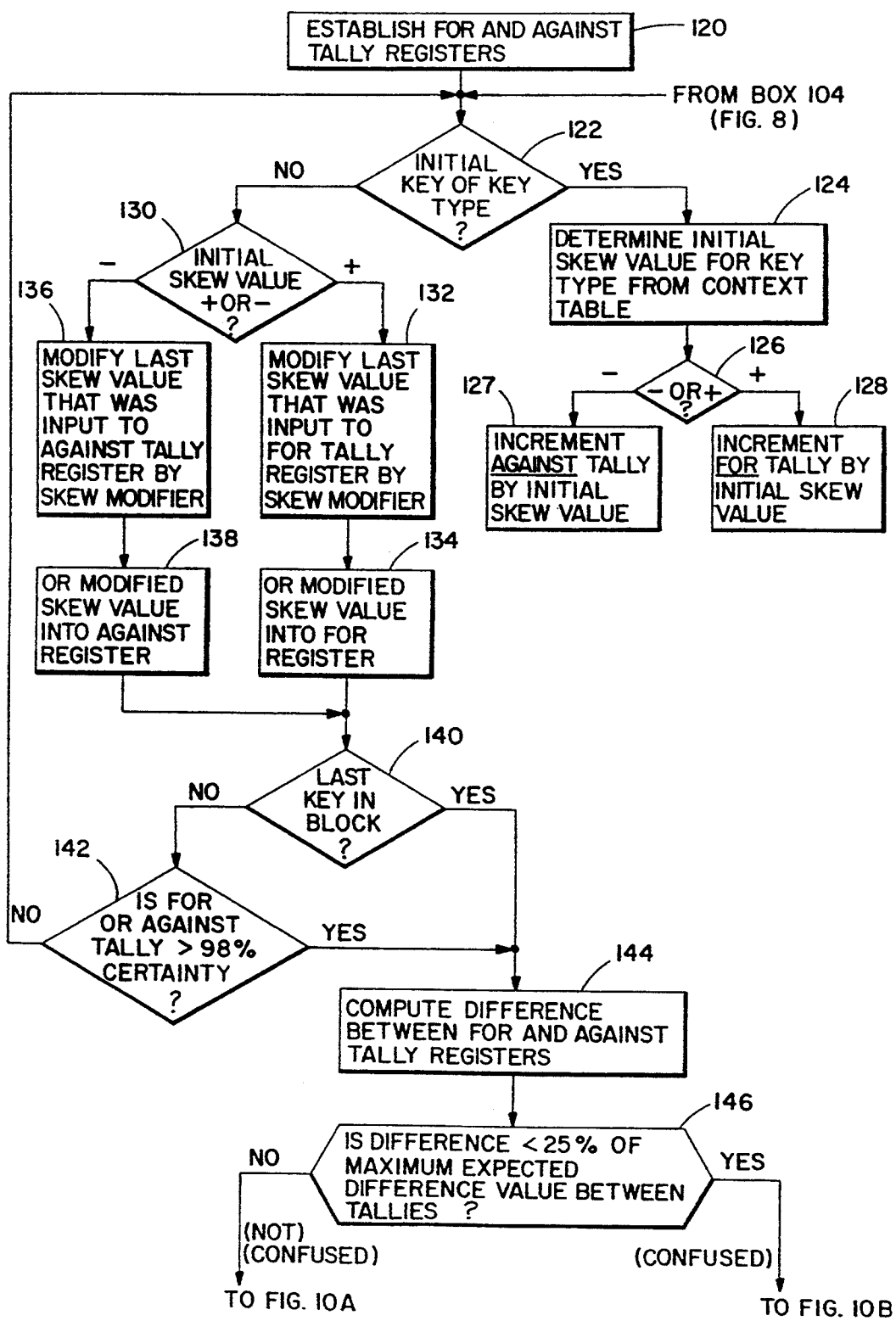

(NOT CONFUSED)

(PCL VOTER MODULE)
(CONFUSED)

(POSTSCRIPT VOTER MODULE)

(DECIDER)

LANGUAGE IDENTIFICATION SYSTEM AND METHOD FOR A PERIPHERAL UNIT

FIELD OF THE INVENTION

This invention relates to the identification of a received language in a data processing system, and more particularly, to a language identification system employing both syntax and context analysis.

BACKGROUND OF THE INVENTION

Modern data processing networks enable various types of computers to interconnect with a communication network. Peripheral units such as printers, plotters etc., are also connected to the communication network and serve as resources for the connected computers. Those peripherals must be able to understand and respond to commands received from the various computers. So long as all connected computers employ the same peripheral control language, a peripheral unit needs to recognize and respond to only one language. When, however, those computers employ different peripheral control languages, the peripheral unit must be able to recognize an incoming language's identity and to respond to commands in the identified language.

Certain peripheral control languages employ initial identification code sequences that identify the language. So long as the various computers attached to the network comply with the language's syntactical encoding requirements, language recognition can occur. However, there is no assurance that such code sequences are invariably enabled on all computers that might possibly connect to a network. A manufacturer of a peripheral unit must anticipate that eventuality, or the eventuality that a particular initial identification code sequence might appear in a data stream of another language, causing an erroneous language switch by the peripheral.

Recently, sophisticated peripheral units employ "context switching" systems wherein the context of a received block of code is analyzed to enable identification of the language to be used with a downloaded job. One such context switcher is the QMS ESP, a product of QMS International, One Magnum Pass, Mobile, Ala. 36618. While the details of the QMS ESP product have not been published, its operation can be implied from an external analysis. The ESP product appears to search for particular strings, symbols and control characters (hereinafter collectively referred to as keys) that are representative of a particular control language. Certain key words enjoy particular importance as being representative of a particular language. In addition, the number of occurrences of a key are given significance.

Based upon statistics accumulated from an initial code sequence, ESP renders a determination of the incoming language. Under certain circumstances, it has been found that ESP does not provide a language identification. It is surmised that such periodic language selection errors occur due to the occurrence of certain keys in more than one language and to the fact that a non-contextual analysis of an incoming data stream will, over a period of time, result in erroneous language indications.

Accordingly, it is an object of this invention to provide an improved language identification system for a peripheral unit.

It is another object of this invention to provide a language identification system which employs both contextual and syntactical analyses of an incoming data stream.

It is yet another object of this invention to provide a language identification system which is expandable to support future languages.

SUMMARY OF THE INVENTION

A data processing system is responsive to a plurality of input languages, each language adhering to a prescribed syntax. The presence of defined portions ("For" keys) in the incoming data indicate a vote for the presence of a language and the presence of other defined portions ("Against" keys) indicate a vote Against the presence of the language. The system performs the following method for identifying the input language: analyzing, for each expected language, the syntax of an incoming block of data to identify For and Against keys in the block of data; providing For and Against tallies for each expected language in response to the analysis, each tally being a summation of key entries, each key entry comprising an identified key count multiplied by a skew, a skew value indicating the importance of the key in the syntax and in the context of said block of data, the For tally sums entries of For keys and the Against tally sums entries of Against keys; comparing the For and Against tallies to determine whether or not they are so close as to signal uncertainty; and, based upon a further syntactical characteristic of the block of data, resolving the uncertainty and indicating a value based on one of the tallies: or indicating a value derived from the larger of the tallies in the event of no uncertainty between the tallies; and deciding, based upon the indicated value for each expected language, the identity of a received language.

DESCRIPTION OF THE DRAWINGS

FIG. 5a illustrates a weight table for keys in the PostScript language.

FIG. 5b illustrates a weight table for keys in the PCL language.

FIG. 6 is a context table for the PostScript language;

FIG. 7 is a context table for the PCL language;

FIGS. 8–11 illustrate a high level flow diagram of the language identification procedure performed by the system of FIG. 1;

DETAILED DESCRIPTION OF THE INVENTION

Figure 1:
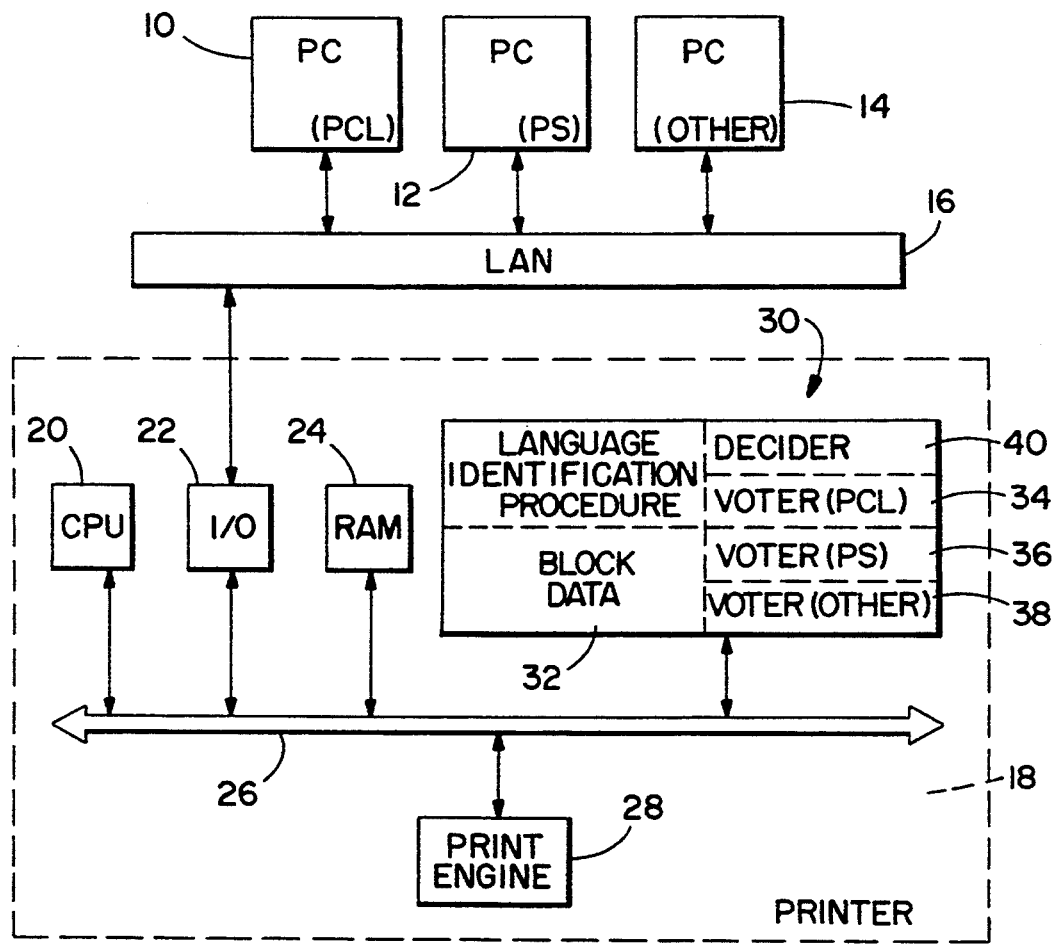
FIG. 1 is a block diagram of a system that embodies the language identification procedure of the invention.

Referring to FIG. 1, personal computers 10, 12 and 14 are interconnected via a local area network (LAN) 16. A printer 18 is also connected to LAN 16 and provides print services for each of personal computers 10, 12 and 14. Hereafter, the invention will be described in the context of printer 18, however, it is to be understood that other data processing systems that perform services for connected computers can also utilize the same invention. Examples of such other peripheral units are plotters, facsimile units, etc.

Computers attached to LAN 16 can employ different printer control languages. To illustrate the invention, it will be assumed that PC 10 employs the printer language known as PCL (printer control language), PC 12 employs the printer language PostScript, and PC 14 employs some other printer control language. The invention enables printer 18 to automatically analyze the context of an incoming command/data stream from any of the PCs 10, 12 and/or 14; to identify the language being received; and to then proceed to carry out print commands in accordance therewith.

Printer 18 includes a central processing unit 20, an input/output (I/O) module 22 and a random access memory module 24, each interconnected via a bus 26 to a print engine 28. A portion of RAM 24 is broken out as shown at 30 and includes that portion of RAM 24 that is utilized for the language identification procedure. Contained therein is a storage area 32 for storing a block of data received from one of PC's 10, 12 or 14. Storage area 32 is preferably large enough to hold a 256 byte block of data. Such a block size has been found sufficient to enable identification of an incoming language without unduly expanding the required processing time.

The language identification procedure includes a plurality of voter modules 34, 36 and 38, each of which is specifically assigned to analysis of an expected printer language. For instance, voter module 34 is assigned to analyze the PCL language, voter 36 to analyze the PostScript language, etc. A decider module 40 receives outputs from each of voter modules 34, 36, and 38 and decides, based upon those voter module inputs, the most likely identity of the received language. Decider 40 then instructs CPU 20 to access the syntactical decoding software that will enable it to interpret and execute the decided-upon language. By having the decider and voter functions embodied in different modules, additional languages can be easily accommodated by the addition of a voter module for each new language.

Figure 2:
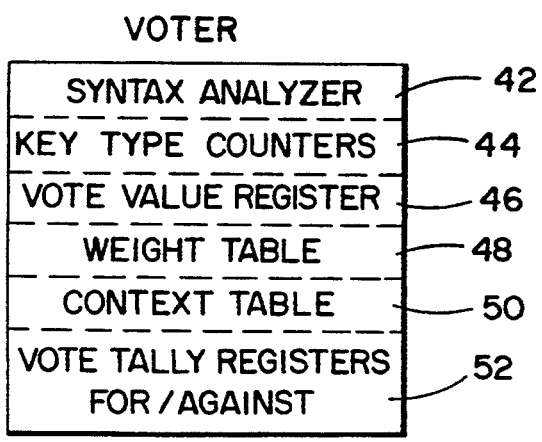
FIG. 2 is a listing of subroutines in a voter module within the language identification procedure shown in FIG. 1.

Turning to FIG. 2, a representative voter module and its main components are shown. Subroutine 42 is a syntax analyzer that is provided with definitions of the voter's assigned language structure and includes both rules and descriptive statements. Through the use of these definitions, syntax analyzer 42 is enabled to parse an incoming data block and to identify portions which are particularly relevant to a determination of the identity of the data block's language. Those relevant portions will be hereinafter referred to as keys. There are both positive and negative keys, with positive keys, if present, indicating For the language, and negative keys, if present, indicating Against the language.

Each voter include a plurality of key counters, one key counter for each type (category) of key. Each voter module further includes a weight table 48 that assigns a weight value to each key as its count is registered. Weight values inserted into weight table 48 will be either positive or negative, depending upon whether the identified key is indicative of the presence of the language or is indicative of an unknown character or other group of characters that are not allowed by the language of syntax. The assigned weight values are summed into a vote value register 46 which maintains a running sum whose value is equal to the summation of the positive and negative weight keys that have been detected in the incoming data stream.

A context table 50 is employed to assign to each detected key a different value (a "skew") that is dependent upon the key and its context in the received data block. Context table 50 includes, for each key type, an initial skew value, which is either multiplied or divided (as the case may be) by a skew modifier to result in a skew value that is dependent upon the context of the key in the data block. The skew values (both plus and minus) are then inputted into a pair of vote tally registers 52 which respectively accumulate positive and negative skew values. Thus, a "For" tally register accumulates all positive skew values resulting from the aforesaid computations while an "Against" tally register accumulates negative skew values.

Figure 3:
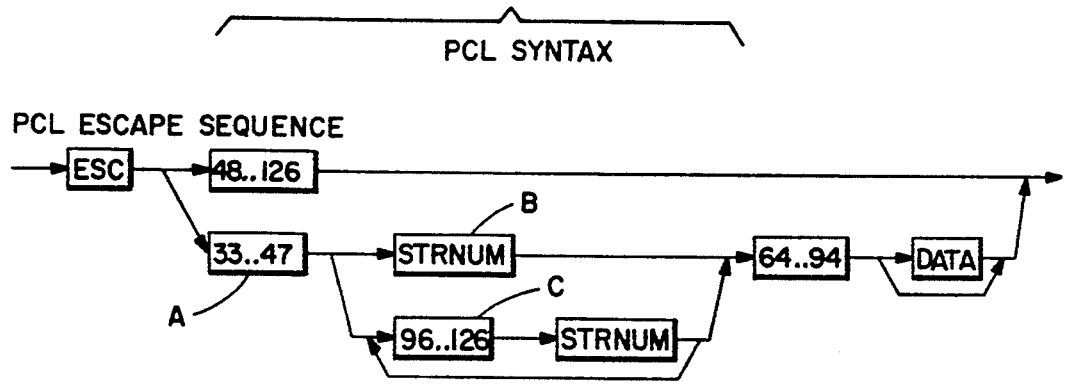
FIG. 3 is a syntactical definition of PCL, a printer control language.
Figure 4:
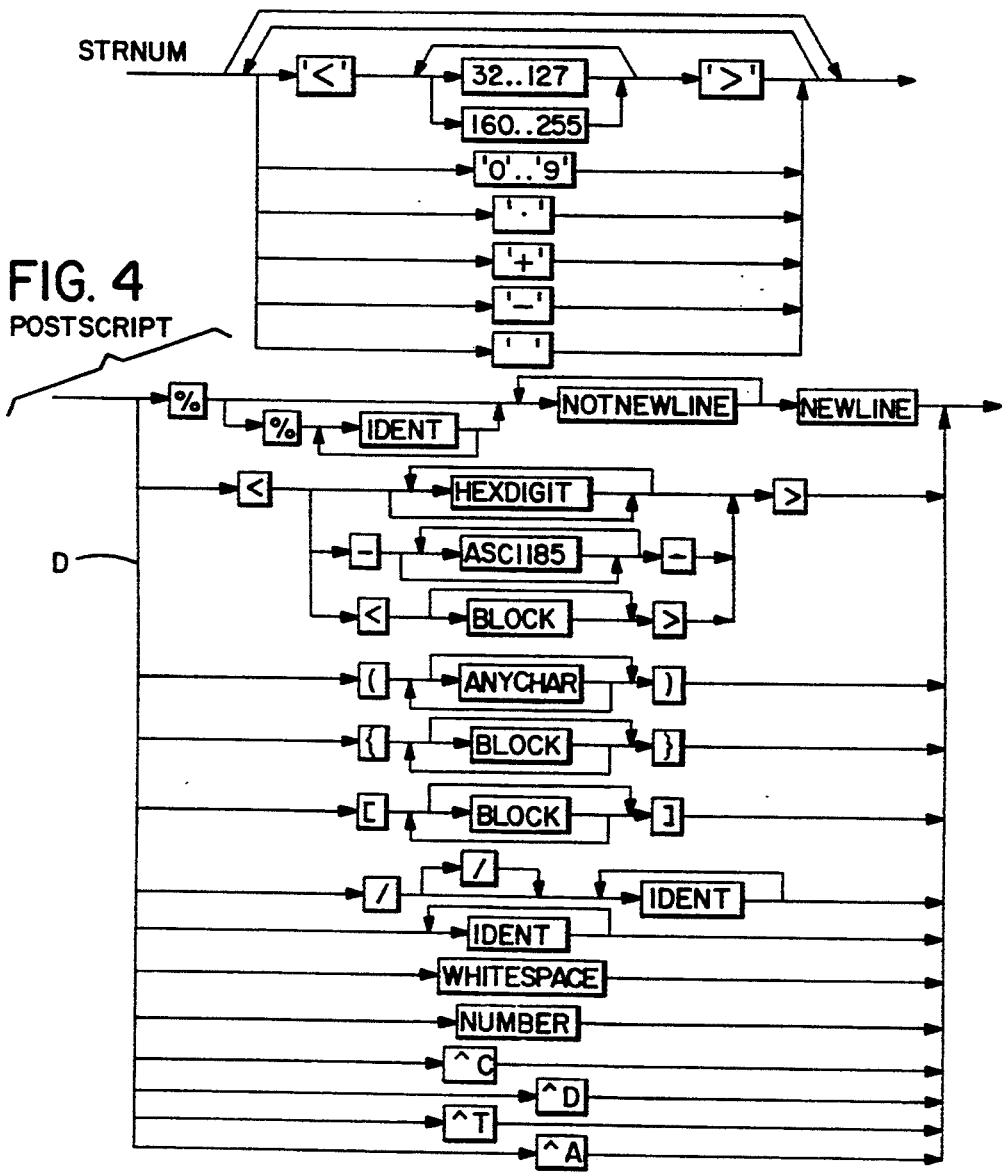
FIG. 4 is a syntactical definition of PostScript, a printer control language.

Turning now to FIGS. 3 and 4, syntaxes for both PCL and PostScript are shown in a logical diagram form. Each logical diagram is embodied as logical statements within the respective syntax analyzer subroutine 42 in the voter module assigned to scan for the particular language. Thus, voter module 34 (FIG. 1) will have logical statements that embody the syntax shown in FIG. 3. The diagram of FIG. 3 can be analyzed as follows. The PCL syntax requires that a print job be preceded by a defined sequence of ASCII character known as an Escape (has a binary numerical value equal to 27). After an Escape sequence is determined, the syntax analyzer proceeds to analyze the next byte in the data flow, and if its binary value is between 48 and 126, the analysis awaits the arrival of the next Escape sequence (not shown). If, after an Escape sequence is detected, the binary value of the next byte is between 33 and 47, the program determines whether succeeding data is a string-number (Str Num) or is a character having a binary value between 96 and 126. A string-number is defined in the PCL syntax as being one of a plurality of alternative characters, each one of which is classified as a string-number (see logic diagram labeled Str Num). After the syntax analyzer determines the presence of a string-number, it proceeds to determine whether the next character value is between 64 and 94 and if so, data following is skipped. Next the procedure returns to scanning for an Escape sequence, etc. The final leg of the logic diagram arises if the character has a value between 96 and 126, at which point a string-number determination is again made, etc.

An example will aid in an understanding of the PCL syntax chart of FIG. 3. Assume that an array of characters with the following values are received: 27, 33 and 96. When the PCL syntax analyzer 42 see a character having a binary value 27, it immediately recognizes it as an ASCII Escape character. Since the next character value is 33, the syntax analyzer increments to box A in FIG. 3, obtains a positive answer and proceeds to an analysis of the next character. Since the next character has a value of 96, it does not match the syntax of a string-number (block B), but does match the condition shown in logic block C. The procedure continues with the PCL syntax analyzer continuing to identify portions of the incoming data stream that find definitions within the PCL syntax listing.

In FIG. 4, a logic chart is shown for PostScript, with the analyses proceeding along vertical line D only if a horizontal logical block condition is not fulfilled. Thus, if the Syntax Analyzer that is resident in Voter module 36 does not see a % in the input data stream, it immediately proceeds to determine whether a "<" indicator is present and, if not, an "(" etc In this manner, syntax analyzer 42 in the PostScript voter module proceeds to analyze for PostScript keys.

Turning now to FIGS. 5a and 5b, weight tables are shown for both the PostScript and PCL languages, and indicate keys that are employed in the language analysis procedure. Turning first to FIG. 5a, the PostScript key types are reserved words, syntax errors, documentation keys, special keys, unknown words and reserved punctuation. A reserved word is one which is defined in the language's syntax as being unavailable for uses, other than that specified by the syntax. A syntax error is an organization of characters which does not meet the syntactical requirements of the language. A documentation format command is a command that is a routing command for a document, or one which defines its format. A special character sequence is one which is defined by the syntax as being specific to the language. Reserved punctuation is similarly defined by the syntax as having specific meaning within the syntax. Finally, unknown words, are just that—words which are not recognized by the syntax.

As shown in the right hand column of FIG. 5a, each key type is assigned a weight, with some weights being positive and others being negative. The negative weights are votes against the language and the positive values are votes for the language. Note that key types which give rise to negative weights are not considered as significant as key types with assigned positive weights. This is due to the fact that the positive weight keys are more indicative of the presence of a language than the negative weight keys are of the absence of a language. The specific weight values indicated in FIG. 5a are empirically derived and are based upon an estimate of the importance of the key type to an identification of the language.

In FIG. 5b, key types are illustrated for the PCL language. The Escape character has been described above. Short sequences and complete sequences are defined sequences of characters defined by the PCL syntax as being special to PCL. Combined sequences are repeated complete sequences. Illegal sequences are sequences of characters that are not recognized by the PCL syntax as being part of the PCL language. An illegal sequence is equivalent to a syntax error in PostScript. Here again, the values on the right hand side of the chart of FIG. 5b are weight values with the positive values voting "for" the PCL language and negative value voting "against".

Returning to FIG. 2, it is there noted that each voter module is provided with key type counters 44. Thus, as can be seen from FIG. 5a, the PostScript voter module 36 will contain 6 key type counters, one for each listed key type. Similarly, as shown in FIG. 5b, the PCL voter module 36 will contain 5 key type counters that maintain a count of the number of each type of key determined from an analysis of an incoming data block. Additionally, each voter module includes a voter value register 46. In each voter module, a vote value register 46 is incremented by the value of the weight assigned to a key type, each time a particular key type is found by syntax analyzer 42. Thus, vote value register 46 indicates a sum that is the cumulative value of the negative and positive weights of all keys found in an incoming block of data.

In FIGS. 6 and 7, context tables are shown for both the PostScript and PCL languages that enable keys derived from a data block to be differently weighted (i.e. "skewed") in accordance with the context of the data block. "Skew" values are then entered in For and Against vote tally registers 52 in each voter module. Each context table includes a key type column that is identical to key type listing found in the weight tables for PostScript and PCL. The "skew direction" column indicates whether the contextual skew that is to be applied to the key type is initially at a maximum and then decreases (ceiling), or is at a minimum and thereafter increases (growing). A "growing" skew direction indicates that successive occurrences of a key type in a data block represent a growing assurance that a data block is configured in the respective language. Conversely, a "ceiling" skew is indicative that the first occurrence of a particular key type is the most important, with subsequent occurrences being of less importance.

The next column of each context chart indicates "initial skew" values assigned to each key type upon its initial occurrence in a data block. These are empirically defined values whose relative sizes indicate the importance of a specific key's initial appearance in a data block to the identification of the language. For explanatory purposes, the values are shown in Arabic numbers, while in actual implementations they will be configured in a hexidecimal notation. The "skew modification" column indicates how initial skew values are to be modified upon subsequent appearances of a key type after its initial appearance. For instance, a first documentation format command key is assigned a value of 40, whereas the second occurrence of a documentation command format key is assigned a value of 10, (40/4), the third occurrence a value of 2.5, (10/4), etc. Similarly, a special punctuation key is initially assigned a value of $2.79 \times 10^{-7}$, which value is multiplied by 4 upon the second occurrence of a special punctuation key. The resulting product is multiplied by 4 upon the third occurrence of special punctuation key type, etc.

In FIG. 7, a context table for the PCL language is shown. Here it is to be noted that the key types short sequence, complete sequence, and combined sequences, are all subjected to the same initial skew value and skew modification upon subsequent occurrences.

As above indicated, each voter module contains both Four And Against vote tally registers 52. The signed values calculated through the use of the context tables are inserted into the For and Against Vote tally registers, with the positive values summed into the For register and the negative values summed into the Against register. Each vote tally register thus manifests a sum that is indicative of the number of key types, in context, within a received data block. The For vote tally register sum indicates the skewed weights of all keys that indicate the presence of a particular language. The Against vote tally register indicates the sum of a skewed weights of keys whose presence suggest that block being analyzed does not use the particular language handled by the respective voter module.

Turning now to FIGS. 8–11, the language identification procedure will be described, in conjunction with the tables shown in FIGS. 5a, 5b, 6 and 7. The procedure commences when a new block of data is received(box 100). While the data block can be of any size, it is preferably chosen to be of a size that enables a reasonable sample of incoming data to be included, while not being too long so as to delay the print function. Preferably, the size of the received block is approximately 256 bytes.

Figure 8:
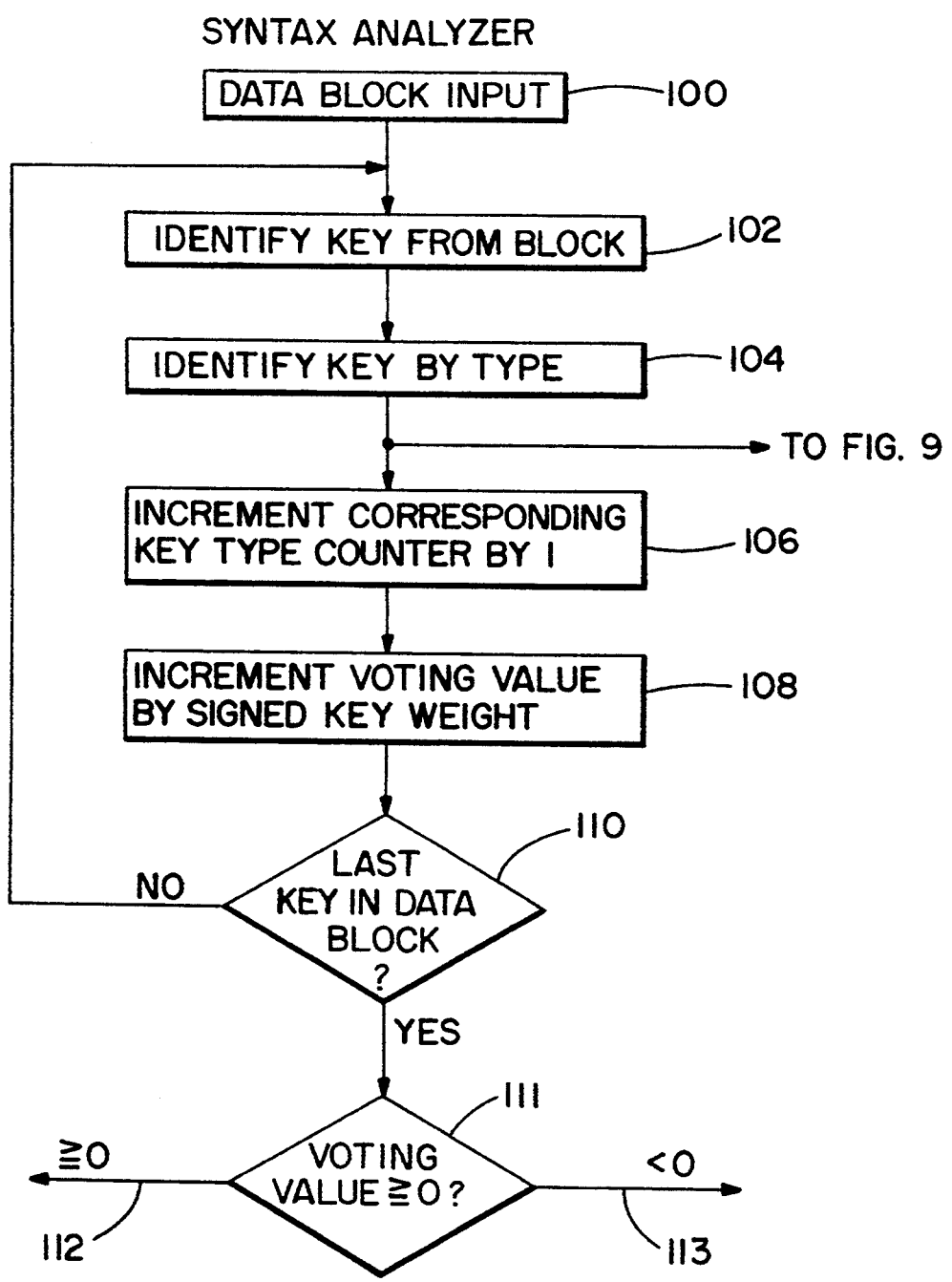

As above indicated, there is a separate voter module provided for each expected language, and in this case it will be assumed that PCL and PostScript are the expected languages. Each voter module operates in parallel and upon the received block input. As shown in FIG. 8, a voter module's syntax analyzer 42 initially identifies keys as they are sequentially found in the data block input (box 102). Those keys are then identified by type (box 104) and corresponding key type counters are incremented by one each time a new key type is determined (box 106). Similarly, each time a key is found, a signed weight is added to the voting value, the weight value being found from a weight table (box 108). For instance, if a PostScript voter module determines the presence of a syntax error, it causes −50 to be added to vote value register 46 (FIG. 2). Similarly, if a special character sequence is determined, a +80 is added to the voter module vote value register 46.

In this manner, a voter module maintains a single running cumulative sum whose value is indicative of weighted votes for and against the language for which the voting module is scanning. The vote value register sum does not, however, take into account the context (i.e. the relationship of the keys) in which the keys appear in the data block. Thus, the accumulated voting value is insufficient to assure consistently accurate language selection.

Within the syntax analyzer, the procedure continues by determining (box 110) if the last key in the data block has been found. If not, the procedure cycles back to the beginning and repeats itself. If the last key has been identified from the incoming data block, the procedure determines whether the value in the voting value register 46 is greater than or less than 0 (decision box 111). If the voting value is greater than or equal to 0, such fact is indicated as output 112 and if it is less than 0, that fact is manifest as output 113.

Concurrent with the syntax analysis described in FIG. 8, each voter module performs a context analysis. The procedure for the context analysis is shown in FIG. 9 and commences with the establishment of For and Against tally registers (box 120). The procedure receives identified keys and key types as an input from box 104 in FIG. 8. For each identified key, the procedure determines whether the key is the initial key of that type identified in the data block. If yes, the procedure determines an initial skew value for the key type from the associated context table (box 124). A PCL voter module employs the values shown in the context table of FIG. 7 and a PostScript voter module employs the values in the context table of FIG. 6.

If the initial skew value is determined to be negative (box 126), the voter module's Against tally is incremented by the initial skew value (box 126). If, by contrast, the initial skew value is positive, the voter module's For tally register is incremented by the initial skew value (box 128).

Returning to decision box 122, if it is determined that the key input from box 104 is not the initial occurrence in the data block of a key of the specific key type, then the procedure increments to decision box 130 to determine whether the initial skew value for the determined key type is positive or negative. If it is positive, the last skew value that was input to the For tally is altered by combination with the skew modifier (box 132). For example, assuming a positive initial skew value, if the skew modifier indicates that the skew value is to be divided by four, the last skew value input to the For tally is divided by four. Similarly, if the skew modifier indicates a multiply action, then the last skew value input to the For tally is multiplied by the modifier value. Then, the modified skew value is OR'd into the For tally register to update its cumulative value. The OR function prevents the bit size of the cumulative value from growing (and essentially eliminates any carries from the sum). Since both the For and Against tallies are handled similarly, a subsequent comparison therebetween is not affected by the lack of the carry function.

Returning to decision box 120, if the initial skew value is found to have a negative value, then the last skew value that was input to the Against tally register is altered by the skew modifier. In the same manner as aforedescribed, if the function indicates a multiply, the last entered skew value is multiplied by the required constant and if a divide is called for, a conforming action takes place (box 136). The procedure then OR's the modified skew value into the Against tally register to update its value.

At this point, the procedure continues by determining whether the last key in the block has been identified (decision box 140), and if not, a further decision is made based upon whether either the For or Against tally indicates a greater than 98% certainty value (decision box 142). This means that if the cumulative value of either the For or Against tally is greater than 98% of the largest value that the respective tally could ever obtain, then the procedure "short circuits" further analysis of keys, and the assumption is that a language has been presumptively identified.

If decision box 142 indicates a no, the procedure recycles to consider the next key. After the last key in the block has been handled (as determined by decision box 140), the procedure computes the difference between the For and Against tally registers (box 144). That computed difference is then compared against a maximum expected difference value that could be expected between the tallies. If the computed difference is less than 25% (an empirical decision point) of the maximum expected difference value, it is assumed that the For and Against tallies are so close (i.e. "confused") as to not allow a definitive decision to be made, based solely upon the above described contextual analysis. If the computed difference is 25% or greater than the maximum expected difference value between the tallies, then a "not confused" output results from decision box 146 and it is assumed that the larger tally value is presumptively accurate.

Figure 10A:
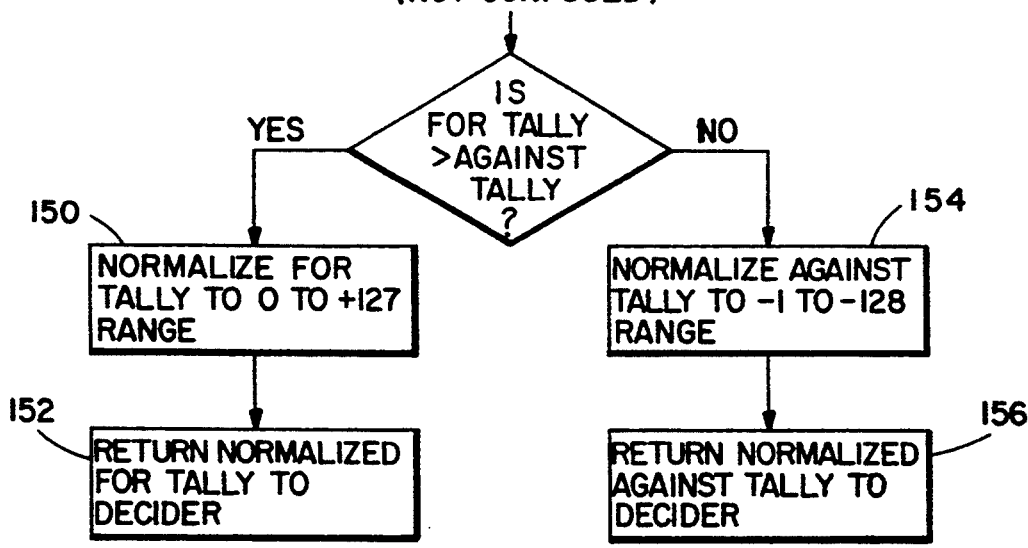

In FIG. 10a, the "not confused" indication from decision box 146 is followed by a determination (decision box 148) as to whether the For tally is greater than the Against tally. Depending on which tally is the greater, the larger tally is then "normalized". If a yes is indicated by decision box 148 (For tally>Against tally), a normalization procedure is performed (box 150) on the For tally to map its value into a range of from 0 to +127. The reason for this normalization action is that For and Against tallies in different voter modules will evidence different cumulative values that are dependent upon the characteristics of the language. Thus, the cumulative values in the various voter modules may have little or no relationship to each other in terms of their absolute values. However, the individual For and Against tally values in each voter module will have a comparative meaning if they are evidenced as a percentage (or equivalent number value) of a maximum value which could exist for the specific tally. Thus, assuming a For tally>Against tally, the For tally is compared to the maximum value that that tally could obtain and a ratio is obtained. That ratio then determines the point within a prescribed numerical range of 0 to +127 into which the tally value is mapped.

Figure 10B:
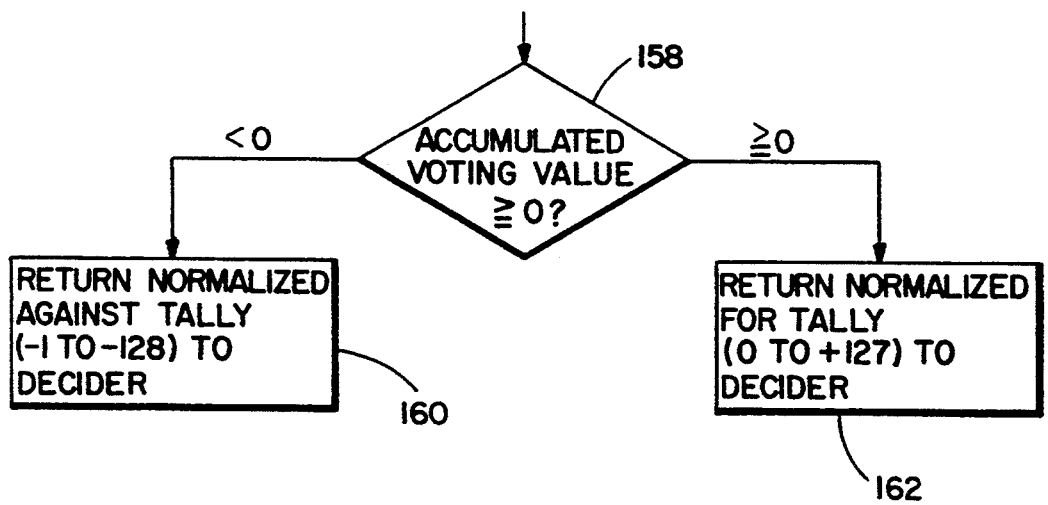
Figure 10C:
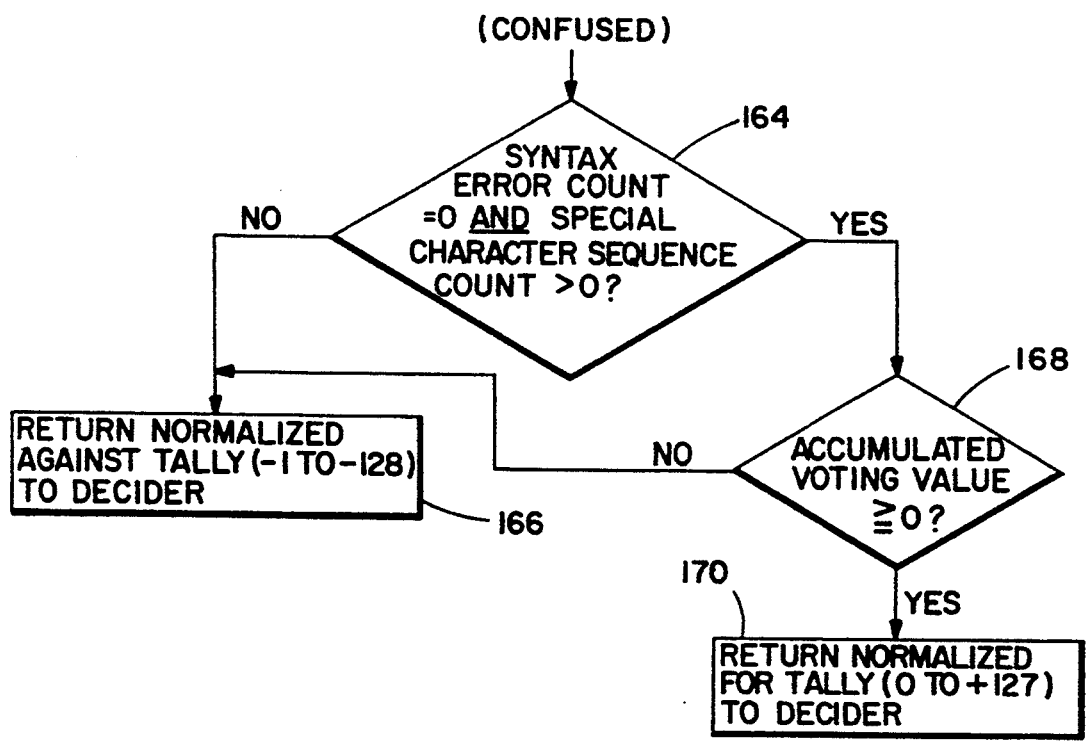

In FIGS. 10b and 10c, procedures are shown for handling a "confused" indication in voter modules assigned to detect PCL and PostScript, respectively. The PostScript procedure is more complex than PCL due to the greater complexity of the Post Script language.

In FIG. 10b, the procedure in a PCL voter module when a confused input is indicated by decision box 146 in FIG. 9. In response to the confused indication the accumulated vote value outputs from decision box 111 in FIG. 8 are examined (decision box 158). If it is found that the accumulated vote value is less than 0, (indicating that the cumulative value of the vote value register in the particular voting module shows a negative sum of accumulated weights), the normalized Against tally is returned to the decider (box 160). If the accumulated vote value is found to be greater than or equal to 0, the For tally (normalized) is returned to the decider (box 162).

In FIG. 10c, the procedure is shown in a PostScript voter module when a confused input is indicated by decision box 146 in FIG. 9. In response, the procedure determines whether, in the syntax analysis of the incoming data block (FIG. 8), no syntax errors were found and that at least one special character sequence has been detected (decision box 164). If syntax errors were found (i.e. a syntax error count not equal to 0), or no special character sequences were detected, the normalized Against tally is returned to the decider module (box 166). If the AND condition indicated in decision box 164 is present, then the accumulated vote value outputs from decision box 111 in FIG. 8 are examined (decision box 168). If it is found that the accumulated vote value is less than 0, (indicating that the cumulative value of the vote value register in the particular voting module shows a negative sum of accumulated weights), the normalized Against tally is returned to the decider (box 166). If the accumulated vote value is found to be greater than 0, the For tally (normalized) is returned to the decider (box 170).

Figure 11:
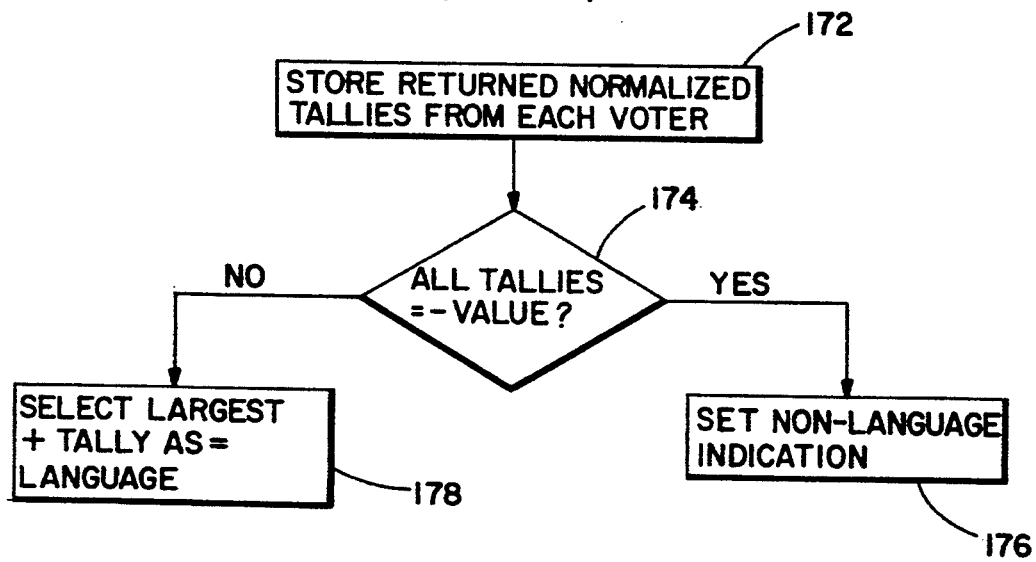

Turning now to FIG. 11, the decider module stores a returned normalized tally from each voter module (box 172). As above described, each voter module will have returned a single number to the decider module that evidences either a value between 0 to +127 or −1 to −128, with the former value being votes for a language and the latter being votes against the language. As shown in decision box 174, if all voter module tallies returned to the decider module are negative, then a non-language indication is set (box 176). On the other hand, if all of the tallies are not negative, then the largest positive tally is selected as being the incoming language (box 178).

In summary, the procedure employs three separate and simultaneous accumulations of analytical data to decide upon a language's identification. Those indications include a count of both positive and negative key weights for each voter module assigned to a particular language; a weighted sum in each voter module that indicates whether the keys found in the incoming data block cumulatively indicate a positive or negative vote For or Against the language; and For and Against tallies that incorporate a contextual analysis based upon the importance of the keys to the language and therefore provide a parallel and independent language vote. The combination of these votes, as indicated in the flow diagrams of FIGS. 8–11, provides a high level of confidence in the ultimate language selection. Furthermore, the arrangement of the decision process into a separate decider module, with a separate voting module for each language, enables the system to be modified to accommodate additional languages that are not contemplated at the outset.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a data processing system responsive to a plurality of input languages, each language adhering to a prescribed syntax, the presence of defined data portions ("For" keys) in incoming data indicating a vote for the presence of a language and the presence of other defined data portions ("Against" keys) indicating a vote Against the presence of the language, a method for identifying an input language comprising the steps of:
    a) analyzing, for each expected language, a syntax of an incoming block of data to identify For and Against keys in said block of data;
    b) providing For and Against tallies for each expected language in response to said analysis, each said tally being a summation of key entries, each key entry comprising an identified key count multiplied by a skew, the value of said skew indicating an importance of said key in said syntax and in the context of said block of data, said For tally summing entries of For keys and said Against tally summing entries of Against keys;
    c) comparing said For and Against tallies to determine whether or not they are so close as to signal uncertainty and, based upon a further syntactical characteristic of said block of data, resolving said uncertainty and indicating a value based on one of said tallies, said indication dependent upon whether said further syntactical characteristic indicates For or Against the language;
    d) indicating a value derived from the larger of the tallies in the event of no uncertainty between the tallies; and
    e) deciding, based upon said indicated value for each said expected language, the identity of a received language.

2. The method as recited in claim 1 wherein said step (a) further comprising the steps of:
    classifying identified For and Against keys by key type;
    incrementing or decrementing a language vote count by a weight value assigned to each key type, the increment or decrement amount being a signed key type weight value preassigned to the key type each time a said key is determined, said vote value being incremented for For key types and decremented for Against key types.

3. The method as recited in claim 2 wherein said further syntactical characteristic defined in step (c) is whether a said language vote count is greater or less than a prescribed value.

4. The method as recited in claim 3 wherein said For key types comprise syntactically conforming characters and sequences, and said Against key types comprise syntactically nonconforming characters and sequences, syntactical errors, unknown words, and illegal sequences.

5. The method as recited in claim 3 wherein said skew for each key type is an initial skew value for a key type modified by a skew modifier, said skew modifier causing said initial skew value to differ for second and subsequent appearances of a key type in a data block.

6. The method as in claim 5 wherein said skew modifier is a multiplier for key types whose subsequent appearances in a data block are more heavily indicative of a language and wherein said skew modifier is a divider when subsequent appearances of a key type in a data block are not as important to the identification of a language as the first appearance of the key type in the data block.

7. The method as recited in claim 6 wherein each time said initial skew value is modified by a skew modifier, the next time said skew is modified by said skew modifier, it is the previously modified skew value that is altered, whereby a non-linear change occurs in skew values over a sequence of skew modifications.

8. The method recited in claim 7 wherein after step b, the method performs the additional steps of:
comparing said For and Against tallies against maximum values that each such tally can obtain, and if either said tally is within a preset limit of said maximum value, ceasing further analysis of a block of data in accordance with step (b) and proceeding directly to step (c).

9. The method as recited in claim 2 wherein said uncertainty determination is made by calculating a difference between said For and Against tallies and comparing said difference against a maximum expected difference therebetween, and if said comparison indicates that said difference is greater than a preset percentage of said maximum difference, indicating confusion regarding a choice as between said tallies.

10. The method as recited in claim 9 where said input languages include PCL, and in response to a confusion indication, a PCL voter module performs the further steps of:
determining if a PCL language vote count is greater than a prescribed value and, if no, indicating a value derived from the Against tally and if yes, indicating a value derived from said For tally.

11. The method as recited in claim 9 where said input languages include PostScript, and in response to a confusion indication, a PostScript voter module performs the further steps of:
determining if no syntax error has been detected in the analysis of the block of data and a special character detected that is present in PostScript, and, if no, indicating a value derived from the Against tally and if yes, and said language vote value is greater than said prescribed value, indicating a value derived from said For tally.

12. The method as recited in claim 1 wherein said comparing step (c) includes the further step of:
mapping said For and Against tallies into a preset range of values, each said tally mapped into said preset range of values in accordance with said tally's relationship to a maximum value each said tally can achieve.

13. A data processing system including software, said system responsive to a plurality of input languages, each language adhering to a prescribed syntax wherein defined data portions ("For" keys) in incoming data indicate a vote for the presence of a language and the presence of other defined data portions ("Against" keys) indicate a vote Against the presence of the language, said system including a voter means for each language and a decider means, each said voter means comprising:
syntax means for analyzing, for an expected language, a syntax of an incoming block of data to identify For and Against keys in the block of data;
tally means for providing For and Against tallies for said language in response to said analysis, each said tally being a summation of key entries, each key entry comprising an identified key count multiplied by a skew, the value of said skew indicating an importance of said key in said syntax and in the context of said block of data, said For tally summing entries of For keys and said Against tally summing entries of Against keys;
first means for comparing said For and Against tallies to determine whether or not they are so close as to signal uncertainty, and, based upon a further syntactical characteristic of said block of data, resolving said uncertainty and indicating a first value based on one of said tallies; and
means for indicating said first value or a second value to said decider means, said second value derived from the larger of the tallies in the event of no uncertainty between the tallies.

14. The data processing system as recited in claim 13 wherein said decider means comprises:
means for examining said indicated values from each said voter means and deciding upon the identity of the language embodied by said incoming data block.

15. The system as recited in claim 14 further comprising:
means for classifying identified For and Against keys by key type; and
weight means for incrementing or decrementing a language vote count by a weight value assigned to each key type, the increment or decrement amount being a signed key type weight value preassigned to the key type each time a said key is determined, said vote value being incremented for For key types and decremented for Against key types.

16. The system as recited in claim 15 wherein said further syntactical characteristic is whether a said language vote count is greater or less than a prescribed value.

17. The system as recited in claim 15 wherein said skew for each key type is an initial skew value for a key type modified by a skew modifier, said skew modifier causing said initial skew value to differ for second and subsequent appearances of a key type in a data block.

18. The system as recited in claim 17, further comprising:
second means for comparing said For and Against tallies against maximum values that each such tally can obtain, and if either said tally is within a preset limit of said maximum value, ceasing further analysis of a block of data by said tally means and operating said first comparing means.

19. The system as recited in claim 18 wherein said first comparison means renders said uncertainty determination by calculating a difference between said For and Against tallies and comparing said difference against a maximum expected difference therebetween, and if said comparison indicates that said difference is greater than a preset percentage of said maximum difference, indicating confusion regarding a choice as between said tallies.

20. The system as recited in claim 13 wherein a said voter means includes means for mapping said For and Against tallies into a preset range of values, each said tally mapped into said preset range of values in accordance with said tally's relationship to a maximum value each said tally can achieve.

21. The data processing system as recited in claim 20 wherein said decider means indicates (1) a non-language if all voter means provide values that are indicative of Against tallys, or (2) a language based upon the largest For tally value provided from a voter means.

* * * * *